July 1, 1924.
W. LEATHERS
1,499,937
VACUUM CLEANER FOR INCLOSED PASSENGER VEHICLES
Filed Aug. 31, 1922
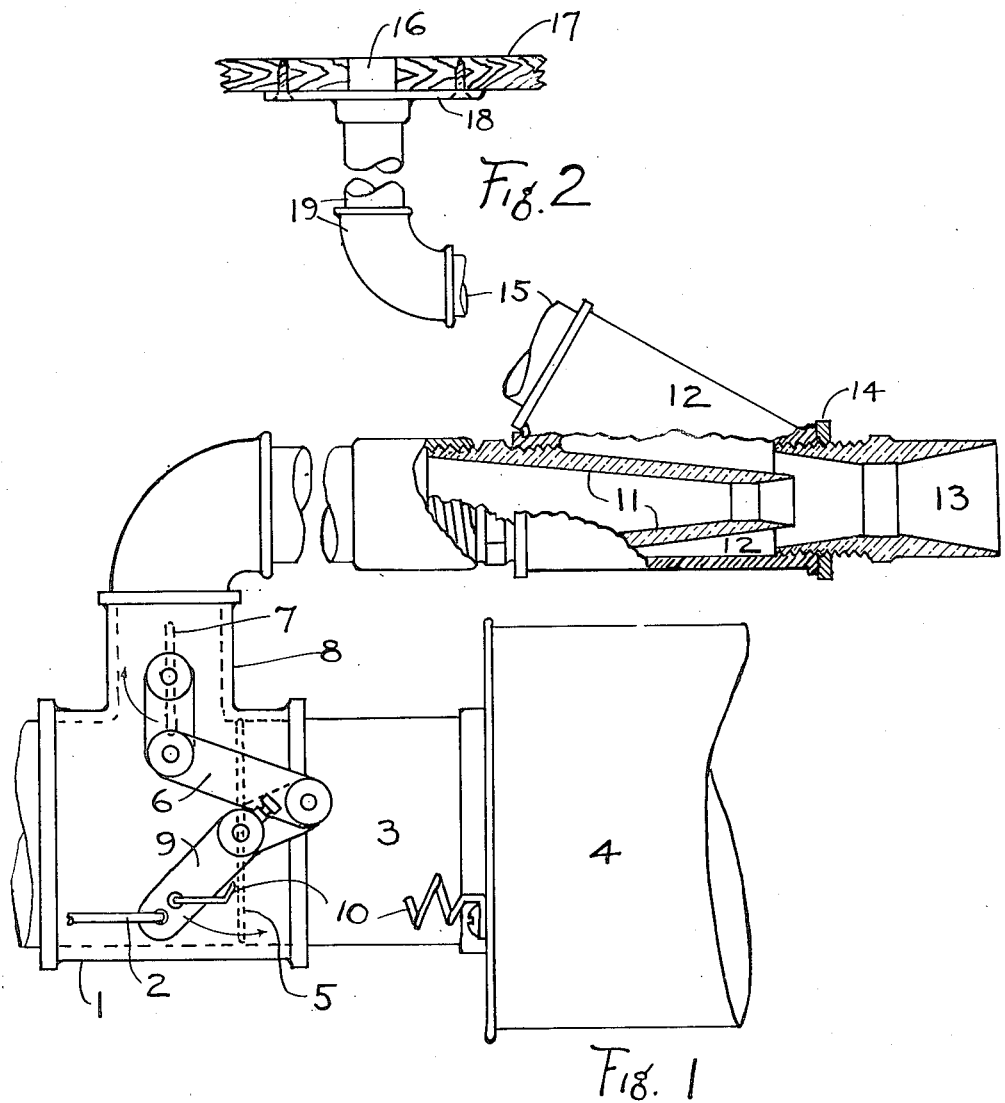
INVENTOR.
Ward Leathers Patented July 1, 1924.

1,499,937

UNITED STATES PATENT OFFICE.

WARD LEATHERS, OF HAWORTH, NEW JERSEY.

VACUUM CLEANER FOR INCLOSED PASSENGER VEHICLES.

Application filed August 31, 1922. Serial No. 585,565.

*To all whom it may concern:*

Be it known that I, WARD LEATHERS, a citizen of the United States, and residing at Haworth, New Jersey, have invented new Improvements in Vacuum Cleaners for Inclosed Passenger Vehicles, of which the following is a specification.

My invention relates to improvements in vacuum cleaners in which the vacuum is produced by an internal combustion engine by means of my devices which utilize the exhaust. The vacuum is produced by exhausting through a jet-forming nozzle, the jet projected into a suitable Venturi or diffuser tube with the jet nozzle and diffuser tube so disposed in a suction chamber that the air in the chamber is ejected by said jet with the production of a partial vacuum in said chamber. This vacuum is used for cleaning purposes by connecting to the vacuum chamber, a pipe with an opening or openings adapted to receive suitable vacuum cleaner hose-ferrules and fittings. Said pipe extends through the floor or wall into the room, automobile body or motor boat cabin that is to be cleaned. A suitable valve is provided which, when put into operation by any suitable means, such as by pulling a wire led to the dash board from the valve, will close the pipe to the exhaust muffler and open a valve in a branch pipe leading from the exhaust pipe to the jet nozzle.

In my improved vacuum cleaner installation, especially on automobiles, it is preferable that the vacuum pipe have its socket for inserting the hose ferrule located inside of the automobile body, either in the floor or on the front wall or dash, so that the vacuum hose be all within the body of the machine and not exposed to dirt and oil as would be the case were the socket outside the body; as, for instance, under the chassis, where the exhaust side of the engine is used, or directly on the admission port to the carbureter where the suction side is used.

In my improved construction, the jet and diffuser nozzles are made separate from the vacuum chamber so as to permit of convenient taking apart in case of clogging.

I attain my purposes by the mechanisms illustrated in the following drawings, in which Fig. 1 is a partially sectioned plan view of the vacuum device applied to the exhaust side of an internal combustion engine.

Fig. 2 is a view in elevation of a suction pipe with socket for vacuum hose ferrule extending through the floor board.

In Fig. 1, 1 is a valve body which, when wire 2 is pulled, closes the exhaust passage 3 to the muffler 4 by means of butterfly valve 5 shown in dotted lines. By means of the link 6 the butterfly valve 7 in side passage 8 is opened at the same time the exhaust passage is closed; lever 9 is returned to the position which opens valve 5 and closes valve 7 by the spring 10 when wire 2 is released. Exhaust gases pass through valve 7 and connections to jet nozzle 11. The gases form a jet and draw air from vacuum chamber 12 and the mixture of air and gases are ejected through diffuser or ejector nozzle 13 to the atmosphere. 14 is a lock nut for holding nozzle 13 securely in adjusted position. 15 is a pipe connection for the suction line. Any form of valve may be used which accomplishes the same purpose as valves 5 and 7.

Many variations of designs of nozzles and jets and connecting pipes and of vacuum pipes can be made and all come within the spirit of my invention.

I claim:

1. In a closed passenger automotive vehicle a permanently installed vacuum cleaner system comprising a source of motive fluid under pressure, a motive fluid connection, a valve, a jet ejector, a vacuum cleaner suction tube line, a vacuum cleaner hose socket, said socket being associated with said suction tube line, said valve being located on said motive fluid connection and adapted to admit motive fluid to said jet ejector, said jet ejector being adapted to eject air from said suction tube line and hose socket, said hose socket being accessible inside the closed compartment of said vehicle and adapted to receive the end of a vacuum cleaner hose.

2. In a closed passenger automotive vehicle, a permanently installed vacuum cleaner system consisting of an engine exhaust pipe, a jet ejector, a passage from said exhaust pipe to said ejector, a valve on said exhaust pipe, said valve adapted to close the normal exhaust passage and open said passage to said ejector, a hose socket located inside the body of said vehicle and adapted to receive the end of a vacuum cleaner hose, a permanent tube connection between said socket and the suction element of said ejector, said ejector adapted to use the engine exhaust to eject air from said cleaner hose through said tube connection, and means for changing said valve from normal exhaust position to the position operative of said ejector.

WARD LEATHERS.